United States Patent [19]

Andersen

[11] 4,446,799

[45] May 8, 1984

[54] FLUIDIZED BED FUEL FEED SYSTEM

[75] Inventor: Mark S. Andersen, Agawam, Mass.

[73] Assignee: Combustion Engineering, Inc., Windsor, Conn.

[21] Appl. No.: 376,098

[22] Filed: May 7, 1982

[51] Int. Cl.³ .............................................. F23D 1/00
[52] U.S. Cl. .................................. 110/263; 110/113; 110/245
[58] Field of Search ................ 110/245, 263, 347, 113

[56] References Cited

U.S. PATENT DOCUMENTS

| | | | |
|---|---|---|---|
| 2,130,329 | 9/1938 | Sammons | 110/113 |
| 3,397,657 | 8/1968 | Tada | 110/245 |
| 4,184,455 | 1/1980 | Talmud et al. | 110/245 X |
| 4,240,364 | 12/1980 | Bryers et al. | 110/245 X |
| 4,312,280 | 1/1982 | Shearer et al. | 110/347 |

Primary Examiner—Edward G. Favors
Attorney, Agent, or Firm—Troxell K. Snyder

[57] ABSTRACT

At least one movable nozzle (14) is mounted in an opening (18) in the wall of a fluidized bed reactor (22). Solid feed materials (62) in granular form are conveyed to the nozzle (14) and injected into the reactor (22). By changing the direction of the solids injection flow stream, the mixing, residence, and reaction characteristics of the reactor (22) may be controlled. The nozzle (14) is elongated and arranged so as to tilt on a horizontal axis (58), and may inject fresh material or recycled material previously removed from the bed reaction zone (34).

3 Claims, 2 Drawing Figures

FLUIDIZED BED FUEL FEED SYSTEM

BACKGROUND OF THE INVENTION

1. Field of the Invention

The present invention relates to a system for feeding solid granulated material into the reaction zone of a fluidized bed reaction system. More particularly, the invention relates to the use of a movable nozzle whereby the solid granulated material may be directed within the fluidized bed reaction zone to control mixing, heat transfer, and solid reactant residence time.

2. Description of the Prior Art

Gas-solid reaction systems employing a fluidized bed to contact the gaseous and solid reactants are an effective means to react these materials. This effectiveness is due in part to the large gas-solid surface contact area inherent in a fluidized bed reaction system. Fluidized bed reaction systems are also characterized by high rates of solids mixing in the bed reaction zone resulting in improved reaction control over fixed- or moving-bed gas-solid gas reaction systems.

Typical gas-solid reactions suitable for fluidized bed reaction systems include: calcining, in which a solid reactant is heated in order to induce a chemical or physical change; drying, in which a moisture bearing solid is heated in order to drive off the moisture; and combustion, in which a solid fuel such as coal is reacted with an oxygen bearing gas for the purpose of producing useful heat energy. It is this latter process which has received great attention in recent years due to the shortage and high cost of liquid petroleum fuels.

A typical fluidized bed reactor comprises a quantity of solid granulated material, or bed, disposed above a perforated plate through which the fluidizing gas is forced. The plate functions to both support the bed of solid material and to distribute the fluidizing gas evenly throughout the reactor. By controlling the velocity of the gas passing through the perforated plate, the bed of granulated material is maintained in a "fluidized" state and constitutes the reaction zone. The range of acceptable velocities for fluidization is dependent upon the size of the individual granules of solid material and the fluid transport properties of the fluidizing gas.

As with any continuing reaction, fresh solid reactant must be continuously supplied and the products of reaction continuously removed. Fresh solid reactant is prepared and introduced into the fluidized bed reaction zone by a variety of methods. Typically, the solid reactant is received in a form which is not suitable for immediate introduction into a fluidized bed reactor. In the case of a fluidized bed coal combustion system, coal and limestone are received as mined with little or no advance preparation. The solid materials are introduced into a mechanical crusher or other means for preparing the as-received materials for introduction into the reactor. In practice this preparation results in a stream of solid reactant granules with varying sizes.

When introduced into the fluidized bed reaction zone, that portion of the solid feed material below a certain granular size quickly becomes entrained in the fluidizing gas and is carried out of the fluidized bed reactor. The short period of time in which these elutriated reactants are present within the zone reduces the probability that they will be reacted, thus resulting in a loss of unreacted solid material from the fluidized bed reactor. This unreacted material loss may represent a significant efficiency penalty in the operation of the fluidized bed reactor system.

Current methods of reducing this loss include providing a separate reactor system for reacting the removed particles or reintroducing the removed particles into the main fluidized bed reaction zone. This latter method has not been successful in that the reintroduced material, having previously been elutriated due to its small particulate size, is subject to the same environment upon reintroduction and is likely to be quickly elutriated from the reaction zone again.

A variety of solid reactant feed systems are present in the art which attempt to evenly distribute the solid reactant throughout the fluidized bed reactor and to increase the residence time of the elutriation-prone granules within the fluidized bed. Typical feed systems presented in the art include: underbed feed systems, wherein the feed stream of solid granules is divided into a plurality of feed pipes arranged beneath the perforated plate of the fluidized bed system and rising therethrough discharging the solid feed material directly into the fluidized bed reactor; overbed feed, in which the solid granules are allowed to drop into the fluidized bed under the influence of gravity through a conduit; and stoker feed systems, in which an apparatus for distributing the feed is arranged above the fluidized bed reactor whereby the solid granules are permitted to drop into the fluidized bed reactor under the influence of gravity.

It can be recognized that the use of overbed or stoker feed systems may result in a portion of the solid feed becoming immediately entrained in the fluidizing gas and never reaching the fluidized bed reactor. The problem of undesirable loss of unreacted solid material has also been recognized in underbed solid feed systems as witnessed by attempts in the art to increase the residence time of granulated within the fluidized bed, for example Zielinski, U.S. Pat. No. 4,309,948.

An additional problem with the use of fluidized bed reactors for the purposes of useful heat generation arises from the limited temperature controllability of the fluidized bed reactor. Temperature in a fluidized bed combustion reactor must be maintained within a limited temperature range. Too low an operating temperature results in incomplete absorption of the sulfur evolved during the combustion process, to high an operating temperature results in fusing and agglomeration of inert ash compounds typically present in the solid fuel.

A common temperature for a fluidized bed coal combustion system using limestone as the sulfur absorbing compound and air as the oxygen bearing gas is about 1500° F. This limitation on the range of operating temperatures of the fluidized bed results in a limitation on the controllability of the heat absorption in the heat absorbing surfaces located in the exit gas stream. Methods currently present in the art for controlling this heat absorption include the use of an attemperating sprays in the heat absorbing medium and/or removing a portion of the fluidized bed reactor from service during periods of reduced load operation.

In summary, fluidized bed reaction systems provide an effective and attractive means for reacting gas solid mixtures, but are presently limited in efficiency and applicability due to poor controllability of the heat absorption rates and the short residence time of very small particles within the reaction zone, resulting in the loss of unreacted solid material.

SUMMARY OF THE INVENTION

The present invention is a system for feeding granulated materials to a fluidized bed reactor characterized by the use of a movable nozzle. By selecting the proper orientation of the movable nozzle in relation to the reaction zone, the granulated feed mixing and residence time is influenced to result in an optimization of fluidized bed reactor performance.

It is a further part of the invention that when the reaction occuring in the fluidized bed reactor is a combustion reaction involving a carbonaceous, sulfur containing solid fuel such as coal, a sulfur absorbent solid such as limestone, and an oxygen-bearing fluidizing gas such as air, the use of the movable feed nozzle permits the system operator to beneficially control the rate at which heat is absorbed in the heat absorption surfaces typically present in this type of reactor. By tilting the nozzle downward into the fluidized bed, the operator lengthens the residence time of smaller particles within the reacting zone bed and increases turbulence of mixing in a vertical direction within the fluidized bed. By directing the solid reactants into an upper portion of the fluidized bed reaction zone, the operator places a larger quantity of fresh fuel into the upper regions of the fluidized bed reactor zone resulting in greater heat release in the upper portion of the fluidized bed reaction zone and greater heat absorption in heat absorbing surfaces located in the above bed gas stream.

Other objects, advantages and features of this invention will become apparent to one skilled in the art upon consideration of the written specification, appended claims and attached drawings.

DESCRIPTION OF THE PREFERRED EMBODIMENT

Figure 1:
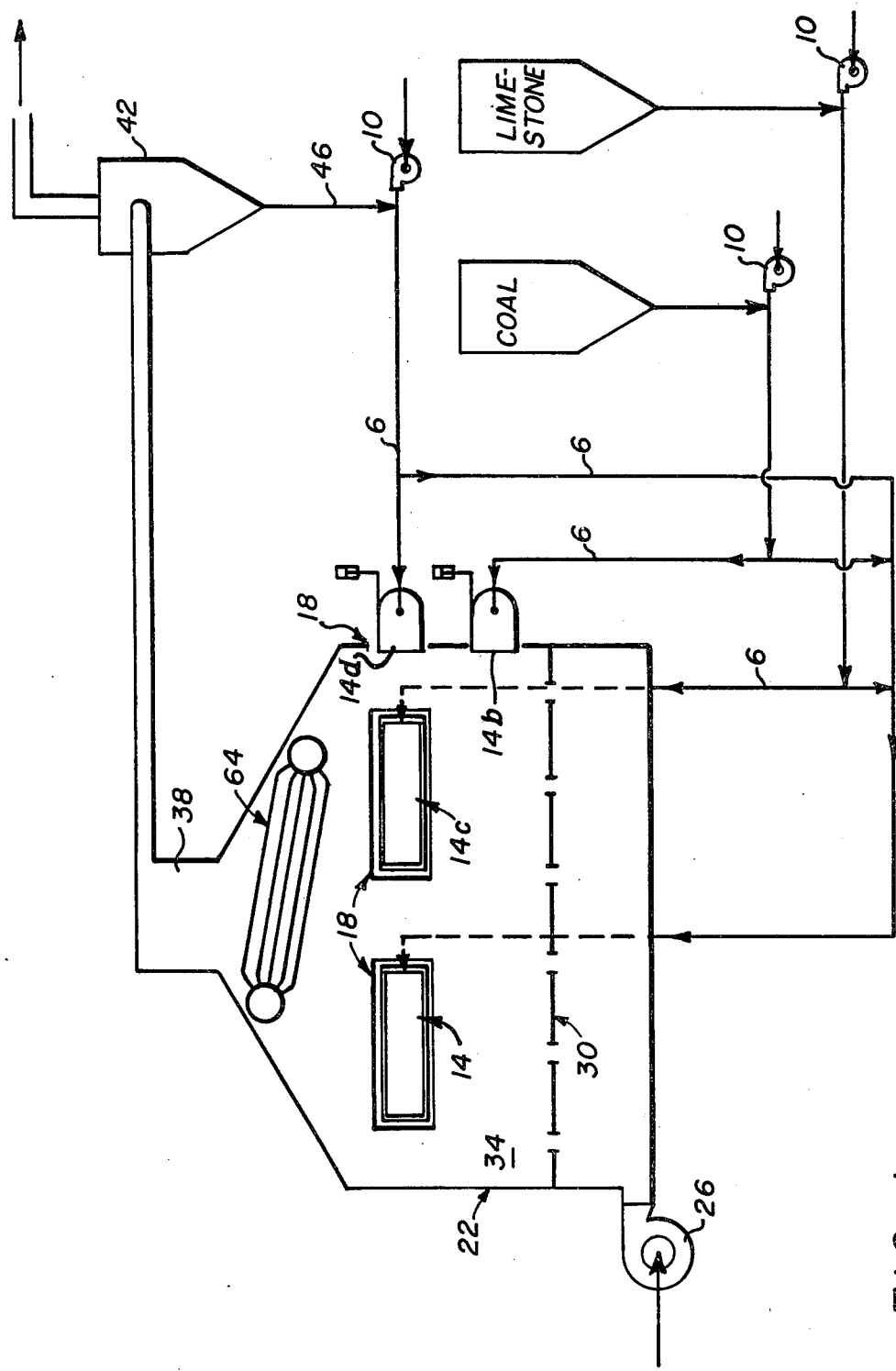
FIG. 1 shows an overall system flow schematic.
Figure 2:
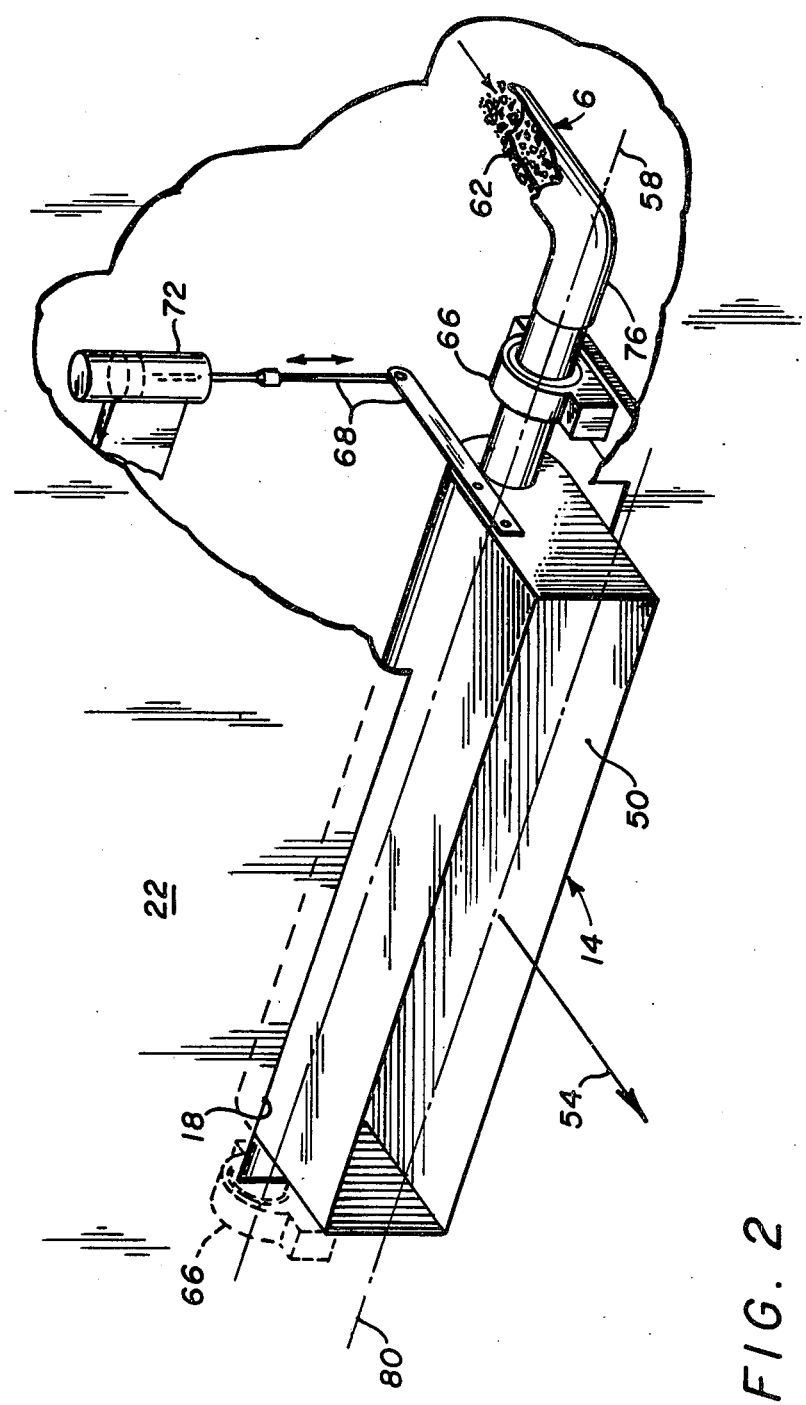
FIG. 2 shows a detailed representation of the nozzle in the preferred embodiment including the means for supporting and moving the nozzle.

The preferred embodiment of the subject invention is depicted in FIGS. 1 and 2. Referring to FIG. 1, a solid fuel, such as coal, and a solid sulfur absorbent, such as limestone, are conveyed pneumatically 6 by air from a primary air fan 10 into the movable nozzle 14 located in a feed opening 18 in the wall of the fluidized bed reaction chamber 22. Combustion air is forced by a secondary air fan 26 through the perforated plate 30 into the reaction zone 34, comprised of fluidized granulated solid material. In the preferred embodiment, the movable nozzle 14 is located near the upper reaches of the reaction zone and is movable in a tilting fashion such that the solid reactants may be injected at any direction from substantially horizontal to steeply declining.

Gaseous products of combustion and solid particulates elutriated from the fluidized bed reaction zone pass through a conduit 38 into a particulate removal apparatus 42 in which at least a portion of the elutriated solid material is removed from the gas stream 46. As shown in the preferred embodiment, it is possible to recycle a portion of this removed particulate matter, termed the recycle solids, to the reaction zone of the fluidized bed by means of a pneumatic conveying system and movable nozzle.

Several other nozzles 14b,c,d are also shown in FIG. 1 and illustrate the manner by which individual feed materials may each be injected separately into the fluidized bed reaction zone. The use of several nozzles to direct individual materials within the reaction zone adds to reactor controllability and flexibility as discussed below.

If it is required that the residence time of the granulated solid feed in the fluidized bed reaction zone be increased, the nozzle in the preferred embodiment may be tilted downward so as to direct the solid material flow stream into the lower portion of the fluidized bed reaction zone. By providing a downward velocity component to the solid feed material, the movable nozzle thus increases mixing within the fluidized bed reaction zone and lengthens the flow path of those small granules which, in the prior art, would have been quickly elutriated from the fluidized bed reaction zone.

Coal, a common feed material for combustion systems, also contains a volatile component which is driven off during the heating of the coal particle. When coal is injected into a fluidized bed combustor, the coal particle undergoes a period of devolatilization as it is warmed within the reaction zone. The volatiles evolved during this process consist of gaseous hydrocarbons which are readily combustible in the presence of an oxygen bearing gas at temperatures present in the zone. By directing the flow of fresh solid fuel within the fluidized bed reaction zone, it is possible to influence the portion of the zone wherein this devolatilization and subsequent combustion will occur. For example, if the fresh coal feed is directed into the upper portion of the fluidized bed reaction zone, the devolatilization of the coal particles will produce gaseous hydrocarbons which will quickly react with the oxygen bearing fluidizing gas resulting in an immediate release of chemical energy in the form of heat.

The proximity of this heat release to heat absorbing surfaces 64 disposed above the fluidized bed reaction zone will facilitate the transfer of this heat energy to these same heat absorbing surfaces. By directing the flow of solid fuel into the lower levels of the fluidized bed reaction zone, it can readily be seen that the devolatilization and subsequent combustion of the volatile matter would occur at a further distance from the heat absorbing surfaces and, furthermore, the heat released must pass through the bulk of the fluidized bed reaction zone before it can be absorbed by the overbed heat absorbing surfaces.

Such a system provides a measure of control not hitherto available in fluidized bed combustion reactors and is desirable in for controlling vapor temperatures in a vapor generating fluidized bed combustion system. By disposing the superheater section of a vapor generator above the fluidized bed reaction zone and employing the present invention to control the amount of heat absorbed in this superheater section, it is possible to maintain constant vapor temperatures over a range of unit loadings and operating conditions.

The use of more than one movable nozzle to direct individual materials, such as limestone, coal and recycle solids into the fluidized bed reaction zone results in placing each individual feed material into the optimum location for efficiency, operability and control purposes. For this application, the individual materials are each fed to a separate nozzle which is placed appropriately in the wall of the fluidized bed chamber. Unreacted solid granules separated from the gas stream by the particulate removal system may be routed to a nozzle directed into the lower region of the reaction zone to take advantage of the longer residence time that would result.

During low load operation, it may also be desirable to direct the fresh coal into the upper portion of the reaction zone in order to augment the heat absorbed by the overbed heat absorption surfaces. It may also be found advantageous to inject the materials concurrently through a single nozzle or a group of nozzles tilted in unison as determined by the operating requirements of the particular fluidized bed combustion system.

FIG. 2 shows a more detailed representation of the preferred embodiment of the invention. In this figure, solid granulated material 62 is conveyed pneumatically in a feed pipe 6 which is connected to a movable nozzle 14 with a joint 76 that permits movement of the nozzle. Solid material flowing from the feed pipe into the nozzle is discharged from the exit opening 50 of the nozzle. The nozzle is shown as a box with an elongated rectangular opening 50 facing into the fluidized bed reaction chamber 22 and situated in a feed opening 18 in the wall of chamber.

The nozzle is supported in the preferred embodiment by bearings 66 which allow the nozzle to be freely tilted during operation. Movement of the nozzle is caused by a mechanical linkage 68 driven by a hydraulic piston actuator 72. The exact means for supporting and moving the nozzle may be different from those shown in the drawings and may include those types of support which allow motion of the nozzle in the desired direction and other means for moving the nozzle such as electrical, pneumatic, manual, etc.

As can readily be seen from FIG. 2, the exit of the solid material from the exit opening of the nozzle defines a flow path vector 54, which will have a direction that is an average of the motion vector of the individual granules discharged from the exit opening. This flow path vector also has a direction which is substantially perpendicular to the plane of the exit opening 50 of the nozzle. In the preferred embodiment, the motion of the nozzle is restricted about a movement axis 58 perpendicular to this flow path, parallel to the major axis 80 of the elongated nozzle exit opening, and lying in the horizontal plane as depicted in the attached figures.

The invention as disclosed represents a novel means for feeding solid material into a fluidized bed reaction system. By using the movable nozzle in an appropriate manner it is possible to direct the flow of solid material into a desired portion of the fluidized bed reaction zone thus providing controllability of the mixing of the fresh solid feed material with the solid material currently present in the fluidized bed reaction zone; augmentation of the residence time of the solid material within the fluidized bed reaction zone; and, in the case of the combustion of a solid fuel containing a volatile component, selection of the location of the evolvement of this volatile component from the solid fuel and its subsequent combustion heat release, for the purpose of influencing the absorption of heat in surfaces arranged in proximity to the fluidized bed reaction zone.

It is recognized that the embodiment herein described is only one of large number of possible embodiments which may be made of the invention without departing from the scope of this disclosure and it is therefore to be understood that the embodiments, figures and descriptions of the present invention herein set forth are to be interpreted in an illustrative, rather than a limiting, sense.

I claim:

1. A system for feeding granulated solid materials, including a fuel, a sulfur absorbent, and a recycle material into a fluidized bed combustor, said combustor having a combustion zone with at least an upper and a lower region therewithin, and said recycle material having been elutriated previously from the combustion zone of said fluidized bed combustor, comprising:
   a walled chamber surrounding the fluidized bed combustion zone, including a plurality of feed openings in the wall of the chamber;
   means for conveying the coal;
   means for conveying the sulfur absorbent;
   means for conveying said recycle material;
   at least three nozzles, each with an exit opening, for separately receiving the conveyed solid materials and discharging each material from the nozzle exit openings;
   means for supporting each of said nozzles in relation to the chamber and the fluidized bed combustion zone so as to permit the movement of said nozzles and to concurrently require each discharged material to pass through the respective feed opening and into a specific region within the fluidized bed combustion zone, the location of each of said regions being dependent upon the orientation of the respective nozzle; and
   means for independently moving each of said nozzles, thereby changing the location of said specific regions within the fluidized bed combustion zone into which each material is discharged.

2. The feed system of claim 1, wherein said nozzles each define an elongated nozzle exit opening; and the means for supporting each of said nozzles restricts the motion thereof about a movement axis parallel to the major axis of said elongated nozzle exit opening of said nozzle.

3. The feed system of claim 2, wherein the movement axis is disposed in a substantially horizontal orientation.

* * * * *